(12) United States Patent
Shen

(10) Patent No.: US 11,368,958 B2
(45) Date of Patent: Jun. 21, 2022

(54) METHOD AND APPARATUS FOR DETERMINING FREQUENCY RESOURCE, AND USER EQUIPMENT

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/103,373

(22) Filed: Nov. 24, 2020

(65) Prior Publication Data

US 2021/0084652 A1 Mar. 18, 2021

Related U.S. Application Data

(63) Continuation of application No. PCT/CN2019/101844, filed on Aug. 21, 2019.

(60) Provisional application No. 62/721,705, filed on Aug. 23, 2018.

(51) Int. Cl.
*H04B 1/7136* (2011.01)
*H04W 72/04* (2009.01)

(52) U.S. Cl.
CPC ...... *H04W 72/0453* (2013.01); *H04B 1/7136* (2013.01)

(58) Field of Classification Search
CPC .................. H04B 1/713; H04B 1/7136; H04B 2001/71362
See application file for complete search history.

(56) References Cited

U.S. PATENT DOCUMENTS

| 9,887,801 | B2 | 2/2018 | Papasakellariou |
| 10,305,623 | B2 | 5/2019 | Papasakellariou |
| 10,305,624 | B2 | 5/2019 | Papasakellariou |
| 2005/0191964 | A1* | 9/2005 | Hundal ................. H04B 1/715 455/63.1 |
| 2016/0269939 | A1 | 9/2016 | Papasakellariou |
| 2018/0159655 | A1 | 6/2018 | Papasakellariou |
| 2018/0159656 | A1 | 6/2018 | Papasakellariou |
| 2020/0374896 | A1 | 11/2020 | Bae et al. |

FOREIGN PATENT DOCUMENTS

| CN | 107872779 A | 4/2016 |
| EP | 3544322 A1 | 9/2019 |
| EP | 3764713 A1 | 1/2021 |

OTHER PUBLICATIONS

Oppo. "Text proposal for DLUL data scheduling and HARQ procedure" 3GPP TSG RAN WG1 Meeting #95 R1-1812831, Nov. 16, 2018 (Nov. 16, 2018), part 2.

(Continued)

*Primary Examiner* — Kevin Kim
(74) *Attorney, Agent, or Firm* — Ladas & Parry LLP

(57) ABSTRACT

Disclosed is a method and apparatus for determining a frequency resource and a user equipment. In the method, for a hop in frequency domain, when a first part of a frequency resource of the hop is outside a first bandwidth part (BWP), the UE moves the frequency resource of the hop, such that the whole frequency resource of the hop is turned inside the first BWP.

14 Claims, 5 Drawing Sheets

(56) References Cited

OTHER PUBLICATIONS

Intel Corporation. "Long PUCCH over multiple slots" 3GPP TSG RAN WG1 Meeting 91 R1-1720090, Dec. 1, 2017 (Dec. 1, 2017), part 2.2.

Intel Corporation. "Remaining details of UL data transmission procedures in NR" 3GPP TSG RAN WG1 Meeting 91 R1-1720097, Dec. 1, 2017 (Dec. 1, 2017), the whole document.

International Search Report in the international application No. PCT/CN2019/101844, dated Nov. 26, 2019.

Written Opinion of the International Search Authority in the international application No. PCT/CN2019/101844, dated Nov. 26, 2019.

LG Electronics, "Remaining issues on UL data transmission procedure", 3GPP TSG RAN WG1 Meeting #93 R1-1806628, Busan, Korea, May 21-25, 2018.

Supplementary European Search Report in the European application No. 19851310.3, dated Oct. 1, 2021.

* cited by examiner 301
for a hop in frequency domain, when a first part of a frequency resource of the hop is outside a first bandwidth part (BWP), a UE moves the frequency resource of the hop, such that the whole frequency resource of the hop becomes inside the first BWP
FIG. 3
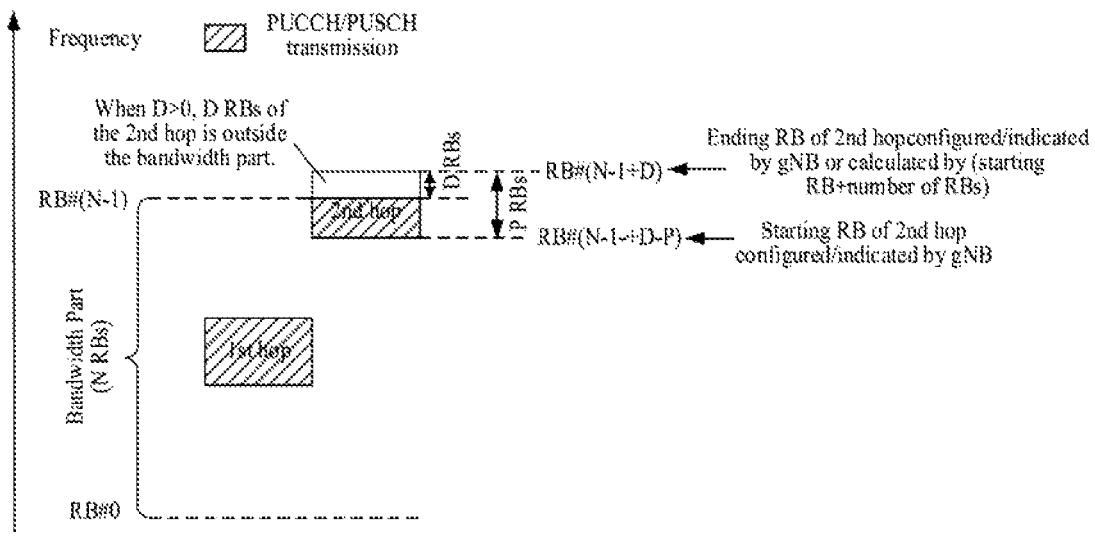
FIG. 4
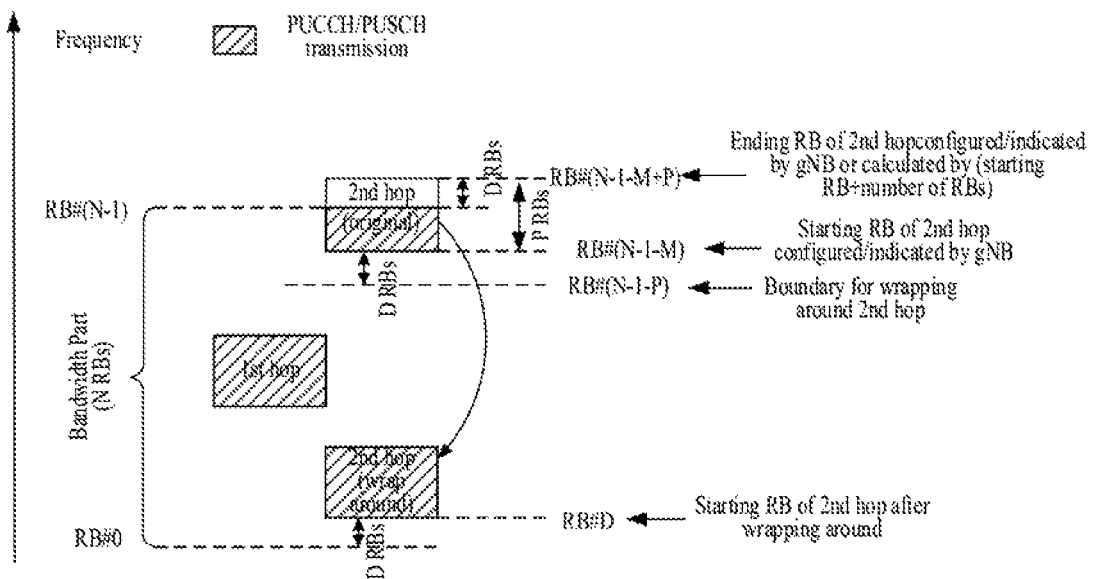
FIG. 5

Apparatus for determining frequency resource 800

First receiving unit 802

Second receiving unit 803

Resource determining unit 801

FIG. 8

User equipment 900

Memory 920

Processor 910

Transceiver 930

FIG. 9

METHOD AND APPARATUS FOR DETERMINING FREQUENCY RESOURCE, AND USER EQUIPMENT

CROSS-REFERENCE TO RELATED APPLICATIONS

The present application is a continuation of International Application No. PCT/CN2019/101844, filed on Aug. 21, 2019, which claims benefit of U.S. Provisional Application No. 62/721,705, filed on Aug. 23, 2018, the disclosures of which are hereby incorporated by reference in their entireties.

TECHNICAL FIELD

The disclosure relates to the field of mobile communications, and in particular to a method and apparatus for determining a frequency resource, and a user equipment.

BACKGROUND

In the fifth-generation (5G) new radio (NR) specifications, frequency hopping is supported for physical uplink shared channel (PUSCH) and physical uplink control channel (PUCCH), and a user equipment (UE) needs to transmit the PUSCH or PUCCH within an active bandwidth part (BWP) in frequency domain. The starting physical resource block (PRB) and number of PRBs used for each hop are configured or indicated by a gNB.

However, this design will lead to some of the PRBs allocated outside the active BWP, thus leading to mistaken PRB usage.

BRIEF DESCRIPTION OF DRAWINGS

In order to describe the technical solutions of the embodiments of the disclosure more clearly, the drawings required to be used in the embodiments of the disclosure will be simply introduced below. The drawings described below are only some embodiments of the disclosure. Other drawings may further be obtained by those skilled in the art according to these drawings without creative work.

FIG. 3 illustrates a flow chart of a method for determining a frequency resource according to some embodiments of the disclosure.

FIG. 4 illustrates a schematic diagram of a second example of frequency resources allocated for hops for PUCCH/PUSCH transmission.

FIG. 5 illustrates a schematic diagram of a first approach of moving a hop in frequency domain according to some embodiments of the disclosure.

FIG. 8 illustrates a block diagram of an apparatus for determining a frequency resource according to some embodiments of the disclosure.

FIG. 9 illustrates a block diagram of a user equipment according to some embodiments of the disclosure.

DETAILED DESCRIPTION

The following clearly and completely describes the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art based on the embodiments of the disclosure without creative efforts shall fall within the protection scope of the disclosure.

The embodiments of the disclosure described below can be applied to various communication systems, for example, the Global System of Mobile communication (GSM) system, the Code Division Multiple Access (CDMA) system, the Wideband Code Division Multiple Access (WCDMA) system, the General Packet Radio Service (GPRS), the Long Term Evolution (LTE) system, LTE Frequency Division Duplex (FDD) system, LTE Time Division Duplex (TDD) system, the Universal Mobile Telecommunication System (UMTS) system, the Worldwide Interoperability for Microwave Access (WiMAX), the 5G system, or the like.

Figure 1:
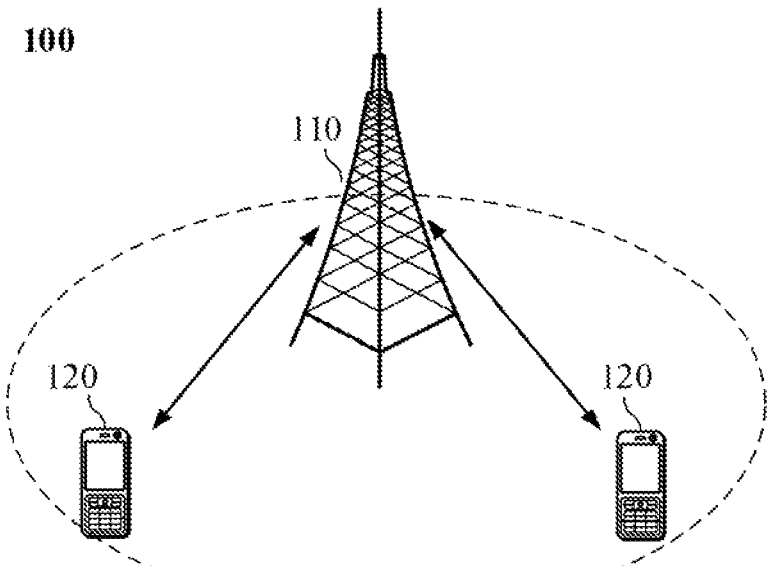
FIG. 1 illustrates a schematic diagram of an architecture of a communication system according to some embodiments of the disclosure.

FIG. 1 illustrates a schematic diagram of an architecture of a communication system 100 according to some embodiments of the disclosure. The wireless communication system 100 may include at least one network device 110. The access network device 100 may be a device communicating with terminal devices 120 (or called communication terminals, terminals). Each of access network device 100 may provide communication coverage for a specific geographical area, and may communicate with terminal devices within the coverage. The network device 100 may be a Base Transceiver Station (BTS) in a GSM system or a Code Division Multiple Access (CDMA) system, or a NodeB (NB) in a WCDMA system, or an Evolutional Node B (eNB or eNodeB) in an LTE system, or a radio controller in a Cloud Radio Access Network (CRAN). Alternatively, the network device may be a relay station, an access point, a vehicle-mounted device, a wearable device, a core network device in the 5G network, an network device in a future evolved Public Land Mobile Network (PLMN), or the like.

The communication system 100 further includes multiple terminal devices 120 within the coverage of the network equipment 110. The terminal devices 120 may be mobile or stationary. Each of terminal devices 120 may be an access terminal, a User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or any other processing device connected to a wireless modem, a vehicle-mounted device, a wearable device, a terminal device in a future 5G network, a terminal device in a future evolved PLMN, or the like.

The terminal devices 120 may communicate with each other through, for example, device to device (D2D) direct connection.

The 5G system or 5G network may be called a new radio (NR) system or an NR network.

FIG. 1 illustrates a network device and two terminal devices. Of course, it is to be understood that the communication system 10 may include multiple network devices 110, and a number of terminal devices under coverage of each of the network devices. The number of the network devices and the number of terminal devices are not limited in the embodiments of the disclosure.

The communication system 100 may further include a network controller, a mobile management entity and other network entities, which are not limited here.

As people of ordinary skill in the art can understand, in the embodiments of the disclosure, devices having a communication function in the network/system may be called a terminal device. Taking the communication system 100 as illustrated in FIG. 1 as an example, the terminal device may include the network device 110 and the terminal device 120, each having the communication function. The terminal device may further include other devices in the communication system 100, for example, the network controller, the mobile management entity and other network entities, which are not limited here.

It is to be understood that, the terms "system" and "network" in the text can be exchanged. The term "and/or" in the text merely describes associations between associated objects, and it indicates three types of relationships. For example. A and/or B may indicate that A exists alone, A and B coexist, or B exists alone. In addition, the character "/" in the text generally indicates that the associated objects are in an "or" relationship.

Embodiments of the present disclosure provide a method and apparatus for determining a frequency resource, and a user equipment.

According to a first aspect of the present disclosure, a method for determining a frequency resource is provided. The method includes that, for a hop in frequency domain, when a first part of a frequency resource of the hop is outside a first bandwidth part (BWP), the UE moves the frequency resource of the hop, such that the whole frequency resource of the hop is turned inside the first BWP.

In combination with the first aspect, in some implementations of the first aspect, the operation of moving the hop includes moving the whole frequency resource of the hop.

In combination with the first aspect, in some implementations of the first aspect, a starting resource block (RB) of the hop prior to the moving and a starting RB of the hop after the moving satisfy the following equation:

$$RB_{start}' = RB_{start} \bmod(N-P)$$

where $RB_{start}$ indicates the starting RB of the hop prior to the moving, N indicates a number of RBs included in the first BWP, and P indicates a number of RBs included in the hop, $RB_{start}'$ indicates the starting RB of the hop after the moving, and mod indicates a modulus operation.

In combination with the first aspect, in some implementations of the first aspect, the starting RB of the hop after the moving is away from the starting RB of the hop prior to the moving by D RBs, where D indicates a number of RBs included in the first part of the frequency resource.

In combination with the first aspect, in some implementations of the first aspect, the operation of moving the hop includes that, the UE moves the first part of the frequency resource of the hop.

In combination with the first aspect, in some implementations of the first aspect, the frequency resource of the hop includes a second part which is inside the first BWP, and the first part after the moving is in front of the second part.

In combination with the first aspect, in some implementations of the first aspect, the starting RB of the first part of the hop after the moving is away from the starting RB of the first part of the hop prior to the moving by P RBs, where P indicates a number of RBs included in the hop.

In combination with the first aspect, in some implementations of the first aspect, the method further includes that, the UE receives a first message from a network device, wherein the first message is to indicate at least one of the following: a starting RB of the hop, or a number of RBs included in the hop.

In combination with the first aspect, in some implementations of the first aspect, the hop is one of hops of an uplink data channel or an uplink control channel.

In combination with the first aspect, in some implementations of the first aspect, the method further includes that, the UE receives a second message from a network device. The second message is to indicate at least one of the following: a starting RB of the first BWP, or a number of RBs included in the first BWP.

In combination with the first aspect, in some implementations of the first aspect, the first BWP is an active BWP for the UE.

According to a second aspect of the present disclosure, an apparatus for determining a frequency resource is provided. The apparatus includes a resource determining unit. The resource determining unit is configured to, for a hop in frequency domain, move a frequency resource of the hop when a first part of the frequency resource of the hop is outside a first bandwidth part (BWP), such that the whole frequency resource of the hop is turned inside the first BWP.

In combination with the second aspect, in some implementations of the second aspect, the resource determining unit is configured to move the whole frequency resource of the hop.

In combination with the second aspect, in some implementations of the second aspect, a starting resource block (RB) of the hop prior to the moving and a starting RB of the hop after the moving satisfy the following equation:

$$RB_{start}' = RB_{start} \bmod(N-P)$$

where $RB_{start}$ indicates the starting RB of the hop prior to the moving. N indicates a number of RBs included in the first BWP, and P indicates a number of RBs included in the hop, $RB_{start}'$ indicates the starting RB of the hop after the moving, and mod indicates a modulus operation.

In combination with the second aspect, in some implementations of the second aspect, the starting RB of the hop after the moving is away from the starting RB of the hop prior to the moving by D RBs, wherein D indicates a number of RBs included in the first part of the frequency resource.

In combination with the second aspect, in some implementations of the second aspect, the resource determining unit is configured to move the first part of the frequency resource of the hop.

In combination with the second aspect, in some implementations of the second aspect, the frequency resource of the hop comprises a second part which is inside the first BWP, and the the first part after the moving is in front of the second part.

In combination with the second aspect, in some implementations of the second aspect, the starting RB of the first part of the hop after the moving is away from the starting RB of the first part of the hop prior to the moving by P RBs, wherein P indicates a number of RBs included in the hop.

In combination with the second aspect, in some implementations of the second aspect, the apparatus further includes a first receiving unit, configured to receive a first message from a network device, wherein the first message is to indicate at least one of the following: a starting RB of the hop, or a number of RBs included in the hop.

In combination with the second aspect, in some implementations of the second aspect, the hop is one of hops of an uplink data channel or an uplink control channel.

In combination with the second aspect, in some implementations of the second aspect, the apparatus further includes a second receiving unit. The second receiving unit is configured to receive a second message from a network device. The second message is to indicate at least one of the following: a starting RB of the first BWP, or a number of RBs included in the first BWP.

In combination with the second aspect, in some implementations of the second aspect, the first BWP is an active BWP for the UE.

According to a third aspect of the present disclosure, a user equipment is provided. The user equipment includes a processor and a memory storing a computer program. The computer program, when executed by the processor, causes the processor to implement the method according to the first aspect.

According to a fourth aspect of the present disclosure, a chip is provided. The chip includes a processor, configured to call a computer program from a memory and run the computer program, to cause a device in which the chip is installed to implement the method according to the first aspect.

According to a fifth aspect of the present disclosure, a computer readable storage medium is provided, in which a computer program is stored. The computer program, when executed by a processor, causes the processor to implement the method according to the first aspect.

According to a sixth aspect of the present disclosure, a computer program product is provided. A computer program is included in the computer program product. The computer program, when executed by a processor, causes the processor to implement the method according to the first aspect.

According to a seventh aspect of the present disclosure, a computer program is provided. The computer program, when executed by a processor, causes the processor to implement the method according to the first aspect.

According to the embodiments of the present disclosure, new approaches are proposed to adjust frequency resources for channel hopping. Without the innovative approaches, a part of frequency resource of the hop may be outside the bandwidth part used for a UE, and cannot be used for uplink transmission. This will lead to severe loss of data or UL signaling, and thus deteriorate the UL performance of the 5G NR system. With the innovative approaches, the uplink channel with frequency hopping can be well confined in the BWP in all cases, and thus the transmission performance and robustness of data or UL signaling can be substantially improved.

Figure 2:
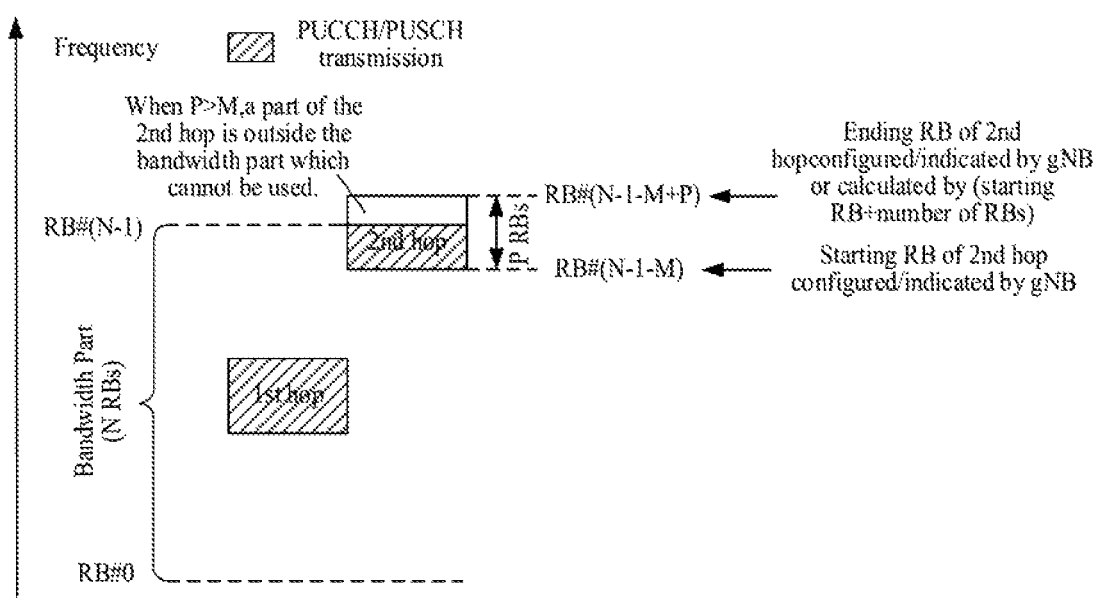
FIG. 2 illustrates a schematic diagram of a first example of frequency resources allocated for hops for PUCCH/PUSCH transmission.

FIG. 2 illustrates a schematic diagram of a first example of frequency hopping. As illustrated in FIG. 2, if the active BWP in size of N RBs spans from RB 0 to RB #(N−1). According to the gNB's configuration/indication, the starting RB index of the 2nd hop of PUSCH/PUCCH is RB #(N−1−M), and the number of RBs of the 2nd hop is P. Thus the ending RB of the 2nd hop is RB #(N−1−M+P). If P>M, the ending RB index of the 2nd hop will be outside the active BWP. In this case, a part of the 2nd hop of PUSCH/PUCCH cannot be transmitted. This will lead to severe loss of data or UL signaling, and thus deteriorate the UL performance of the 5G NR system.

In view of the above, in an example of the disclosure, a method is proposed to adjust frequency resource for PUSCH/PUCCH hopping. Without the innovative approach, a part of frequency resource of the $2^{nd}$ hop or even-numbered hop may be outside the bandwidth part used for a UE, and cannot be used for PUSCH/PUCCH transmission. This will lead to severe loss of data or UL signaling, and thus deteriorate the UL performance of the 5G NR system. With the innovative approaches, the PUCCH/PUSCH with frequency hopping can be well confined in the BWP in all cases, thus the transmission performance and robustness of data or UL signaling can be substantially improved.

It is to be noted that the term "RB" mentioned in the above example can be used interchangeably with the term "physical resource block (PRB)".

FIG. 3 illustrates a flow chart of a method for determining a frequency resource according to some embodiments of the disclosure. As illustrated in FIG. 3, the method for determining the frequency resource includes the following actions illustrated in blocks. The method may begin at block 301.

At block 301, for a hop in frequency domain, when a first part of a frequency resource of the hop is outside a first bandwidth part (BWP), a UE moves the frequency resource of the hop, such that the whole frequency resource of the hop is turned inside the first BWP.

In the embodiments of the present disclosure, the UE may be a mobile phone, a laptop, a notebook computer, a wearable device, an in-vehicle terminal, or any other device that can communicate with the network.

In the embodiments of the present disclosure, the hop is a hop in an uplink data channel or an uplink control channel. In an embodiment of the present disclosure, the UE receives a first message from a network device, and the first message is to indicate at least one of the following: a starting RB of the hop, or the number of RBs included in the hop. Here, the first message may be radio resource control (RRC) signaling, system information, or downlink control information (DCI).

In the embodiments of the present disclosure, the first BWP is an active BWP for the UE. In an embodiment of the present disclosure, the UE receives a second message from a network device, and the second message is to indicate at least one of the following: a starting RB of the first BWP, or the number of RBs included in the first BWP. Here, the first message may be radio resource control (RRC) signaling, system information, or DCI.

For PUSCH/PUCCH with frequency hopping, when a part of frequency resource of $n^{th}$ hop (n>1) of the PUSCH/PUCCH is outside the first BWP used by the UE, according to the gNB configuration/indication (or calculated based on gNB configuration/indication), several approaches may be adopted to move the part of frequency resource back into the BWP.

Different approaches are described below to illustrate how the UE may move the frequency resource for the hop.

In a first approach, the UE moves the whole frequency resource of the hop, such that the whole frequency resource of the hop is turned inside the first BWP. A starting resource block (RB) of the hop prior to the moving and a starting RB of the hop after the moving satisfy the following equation:

$$RB_{start}' = RB_{start} \bmod (N-P)$$

where $RB_{start}$ indicates the starting RB of the hop prior to the moving, N indicates a number of RBs included in the first BWP, and P indicates a number of RBs included in the hop, $RB_{start}'$ indicates the starting RB of the hop after the moving, and mod indicates a modulus operation.

The first approach is illustrated in the blow in conjunction with FIGS. 4 and 5.

In the first approach, when the ending RB is outside the BWP, wrap around the whole hop back into the BWP.

If the active BWP in size of N RBs spans from RB 0 to RB #(N−1). According to the gNB's configuration/indication, the starting RB index of the $2^{nd}$ hop of PUSCH/PUCCH is RB #(N−1+D−P), and the number of RBs of the $2^{nd}$ hop is P. Thus the ending RB index of the $2^{nd}$ hop is RB #(N−1+D). If D>0, D RBs of the $2^{nd}$ hop will be outside the active BWP, as shown in FIG. 4. (In FIG. 2. D=P−M.)

The first approach is, as illustrated in FIG. 5: since the starting RB index is D RBs larger than RB #(N−1−P)(which is: upper edge of BWP−number of RBs of $n^{nd}$ hop), the starting RB of the $n^{th}$ hop is wrapped around back to RB #D.

And this approach can be formulated as in following equation:

$$RB_{start}' = RB_{start} \bmod (N-P)$$

where $RB_{start}$ is the starting RB of the $n^{th}$ hop (n>1) according to the gNB configuration/indication (or calculated based on gNB configuration/indication), N is the size of BWP, and P is the number of RBs for the $n^{th}$ hop. $RB_{start}'$ is the starting RB of the $n^{th}$ hop after mod operation.

In a second approach, the UE moves the whole frequency resource of the hop, such that the whole frequency resource of the hop is turned inside the first BWP. The starting RB of the hop after the moving is away from the starting RB of the hop prior to the moving by D RBs, where D indicates a number of RBs included in the first part of the frequency resource.

Figure 6:
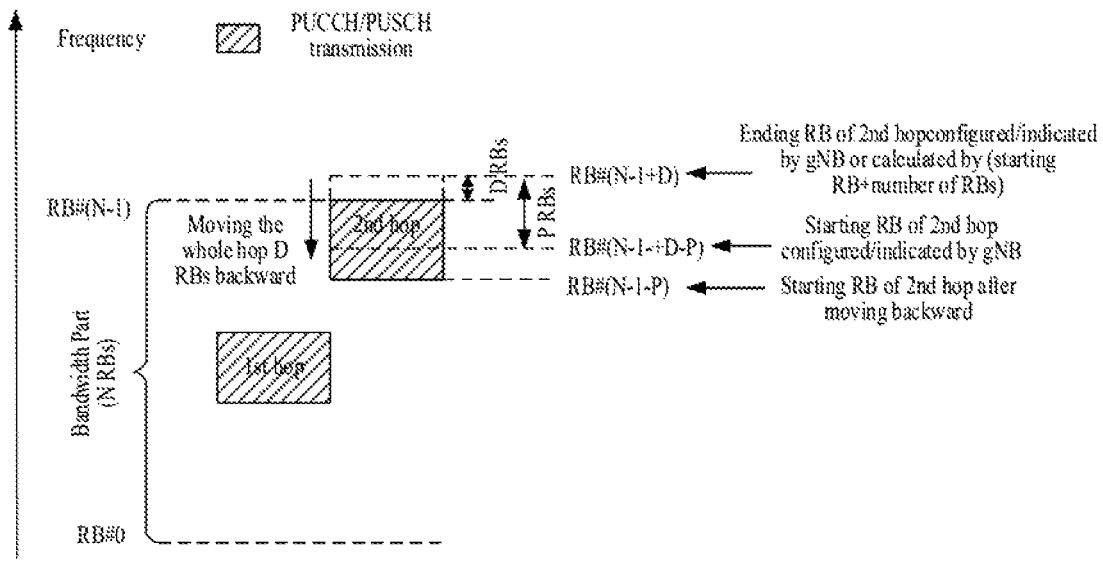
FIG. 6 illustrates a schematic diagram of a second approach of moving a hop in frequency domain according to some embodiments of the disclosure.

The second approach is illustrated in the blow in conjunction with FIGS. 4 and 6.

In the second approach, when the ending RB of the nth hop is outside the BWP, move the whole hop backward until the hop returns inside the BWP.

If the active BWP in size of N RBs spans from RB 0 to RB #(N−1). According to the gNB's configuration/indication, the starting RB index of the $2^{nd}$ hop of PUSCH/PUCCH is RB #(N−1+D−P), and the number of RBs of the $2^{nd}$ hop is P. Thus the ending RB index of the $2^{nd}$ hop is RB #(N−1+D). If D>0, D RBs of the $2^{nd}$ hop will be outside the active BWP, as shown in FIG. 4. (In FIG. 2, D=P−M.)

The approach is, as shown in FIG. 6: Since the ending RB index is D RBs larger than RB #(N−1) (which is the upper edge of BWP), the RBs for the hop is moved D RBs backward, i.e. moving from RB #(N−1+D−P) RB #(N−1+D) to RB #(N−1−P)~RB #(N−1).

And this approach can be formulated as in following equation:

$$RB_{start}' = RB_{start} - (RB_{end} - (N-1))$$

where $RB_{start}'$ is the starting RB index of the n hop (n>1) according to the gNB configuration/indication (or calculated based on gNB configuration/indication), $RB_{end}$ is the ending RB index of the $n^{th}$ hop (n>1) according to the gNB configuration/indication (or calculated based on gNB configuration/indication), and N is the size of BWP. $RB_{start}'$ is the starting RB of the $n^{th}$ hop after moving backward.

In a third approach, the UE moves the first part of the frequency resource of the hop, such that the whole frequency resource of the hop is turned inside the first BWP. The frequency resource of the hop includes a second part which is inside the first BWP, and the first part after the moving is in front of the second part. For example, the first part, which has D RBs, is moved from RB #(N)~RB #(N−1+D) to RB #(N−1−P) RB #(N−2+D−P), and the second part remains at RB #(N−1+D−P) to RB #(N−1). Further, the starting RB of the first part of the hop after the moving is away from the starting RB of the first part of the hop prior to the moving by P RBs, where P indicates a number of RBs included in the hop.

The third approach is illustrated in the below in conjunction with FIGS. 4 and 7.

In the first approach, when the ending RB of the $n^{th}$ hop is outside the BWP, only wrap around the part outside the BWP edge back into the BWP and place the part just in front of the part inside the BWP.

If the active BWP in size of N RBs spans from RB 0 to RB #(N−1). According to the gNB's configuration/indication, the starting RB index of the $2^{nd}$ hop of PUSCH/PUCCH is RB #(N−1+D−P), and the number of RBs of the $2^{nd}$ hop is P. Thus the ending RB index of the $2^{nd}$ hop is RB #(N−1+D). If D>0, D RBs of the $2^{nd}$ hop will be outside the active BWP, as shown in FIG. 4. (in FIG. 2, D=P−M.)

Figure 7:
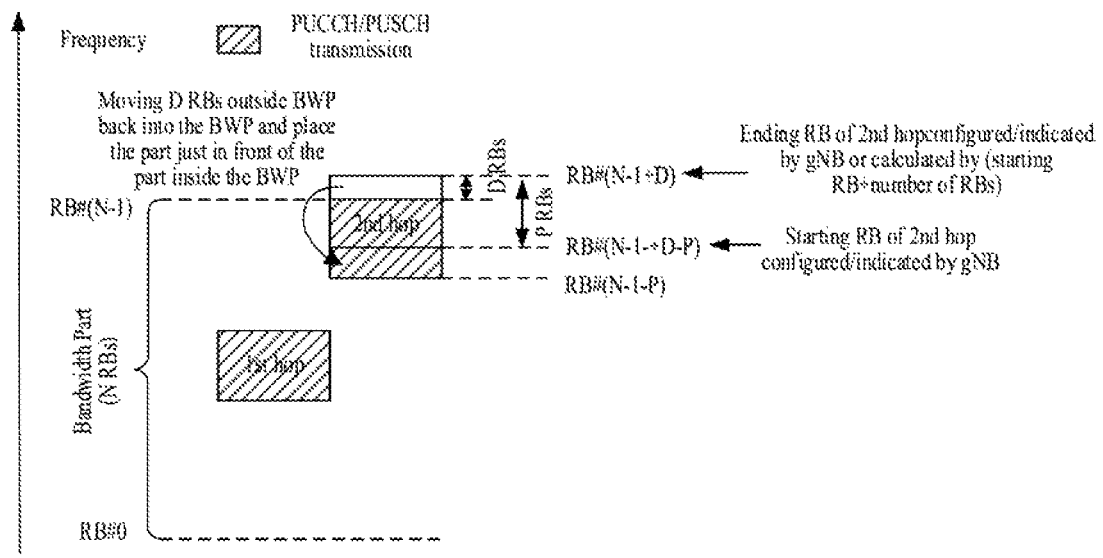
FIG. 7 illustrates a schematic diagram of a third approach of moving a hop in frequency domain according to some embodiments of the disclosure.

The approach is, as illustrated in FIG. 7, since the ending RB index is D RBs larger than RB #(N−1) (which is the upper edge of BWP), the part RB #N~RB #(N+D−1) are moved to RB #(N−1−P) RB #(N−1+D−P).

For any of the first, second and third approaches, one or more of the following actions can be included.

The UE determines the information about the starting RB of the $1^{st}$ hop or odd-numbered hop of the PUSCH/PUCCH based on the message I from network side. The message I may be RRC signaling, system information or DCI.

The UE determines the information about the starting RB of the $2^{nd}$ hop or even-numbered hop of the PUSCH/PUCCH based on the message II from network side. The message II may be RRC signaling, system information or DCI.

The UE determines the information about the number of RBs for each hop of the PUSCH/PUCCH based on the message III from the network side. The message III may be RRC signaling, system information or DCI.

As described above, new approaches are designed to adjust frequency resources for PUSCH/PUCCH hopping. Without the innovative approaches, a part of frequency resource of the hop may be outside the bandwidth part used for a UE, and cannot be used for PUSCH/PUCCH transmission. This will lead to severe loss of data or UL signaling, and thus deteriorate the UL performance of the 5G NR system. With the innovative approaches, the PUCCH/PUSCH with frequency hopping can be well confined in the BWP in all cases, thus the transmission performance and robustness of data or UL signaling can be substantially improved.

To implement the method for determining a frequency resource as described above, embodiments of the present disclosure provide an apparatus for determining a frequency resource. As illustrated in FIG. 8, the apparatus includes a resource determining unit 801.

The resource determining unit 801 is configured to for a hop in frequency domain, move a frequency resource of the hop when a first part of the frequency resource of the hop is outside a first bandwidth part (BWP), such that the whole frequency resource of the hop is turned inside the first BWP.

In some embodiments of the present disclosure, the resource determining unit is configured to move the whole frequency resource of the hop, such that the whole frequency resource of the hop becomes inside the first BWP.

In some embodiments of the present disclosure, a starting resource block (RB) of the hop prior to the moving and a starting RB of the hop after the moving satisfy the following equation:

$$RB_{start}'=RB_{start} \mod(N-P)$$

where $RB_{start}$ indicates the starting RB of the hop prior to the moving, N indicates a number of RBs included in the first BWP, and P indicates a number of RBs included in the hop, $RB_{start}'$ indicates the starting RB of the hop after the moving, and mod indicates a modulus operation.

In some embodiments of the present disclosure, the starting RB of the hop after the moving is away from the starting RB of the hop prior to the moving by D RBs, where D indicates a number of RBs included in the first part of the frequency resource.

In some embodiments of the present disclosure, the resource determining unit is configured to move the first part of the frequency resource of the hop, such that the whole frequency resource of the hop is turned inside the first BWP.

In some embodiments of the present disclosure, the frequency resource of the hop comprises a second part which is inside the first BWP, and the first part after the moving is in front of the second part.

In some embodiments of the present disclosure, the starting RB of the first part of the hop after the moving is away from the starting RB of the first part of the hop prior to the moving by P RBs, wherein P indicates the number of RBs included in the hop.

In some embodiments of the present disclosure, the apparatus further includes a first receiving unit 802, configured to receive a first message from a network device, wherein the first message is to indicate at least one of the following: a starting RB of the hop, or the number of RBs included in the hop.

In some embodiments of the present disclosure, the hop is one of hops of an uplink data channel or an uplink control channel.

In some embodiments of the present disclosure, the apparatus further includes a second receiving unit 803, configured to receive a second message from a network device, wherein the second message is to indicate at least one of the following: a starting RB of the first BWP, or a number of RBs included in the first BWP.

In some embodiments of the present disclosure, the first BWP is an active BWP for the UE.

FIG. 9 illustrates a schematic block diagram of a UE 900 according to some embodiments of the disclosure. As illustrated in FIG. 9, the UE 900 includes a processor 910. The processor 910 may call a computer program from a memory to implement one of the methods described above.

Alternatively, as illustrated in FIG. 9, the UE 900 may further include a memory 920. A compute program is stored in the memory 920. The processor 910 may call the computer program from the memory 920 to implement one of the methods described above.

The memory 920 may be a device independent from the processor 910, or may be integrated in the processor 910.

In an example, the UE 900 may further include a transceiver 930. The processor 910 may communicate with other device via the transceiver 930, for example, receive information or data from other device, or send information or data to other device.

The transceiver 930 may include a transmitter and a receiver. The transceiver 830 may further include one or more antennae.

In an example, the UE 800 may be a network device and configured to implement one of the processes implemented by the network device as described above. The specific processes will not be elaborated herein for simplicity.

In an example, the UE 800 may be a mobile terminal or a terminal device and configured to implement one of the processes implemented by the mobile terminal or the terminal device as described above. The specific processes will not be elaborated herein for simplicity.

Figure 10:
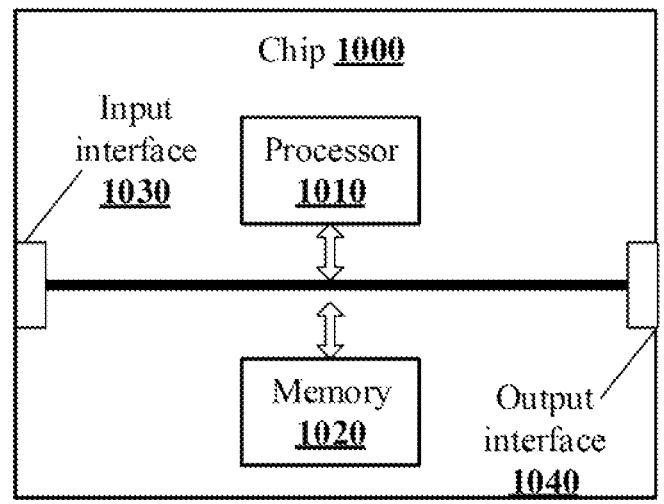
FIG. 10 illustrates a block diagram of a chip according to some embodiments of the disclosure.

FIG. 10 illustrates a schematic block diagram of a chip according to some embodiments of the disclosure. The chip 1000 may include a processor 1010, which may call a computer program from a memory to implement the methods as described above.

In an example, as illustrated in FIG. 10, the chip (100 may include a memory 1020. The processor 1010 may call a computer program from a memory 1020 to implement the methods as described above.

In an example, the memory 1020 may be a device independent from the processor 1010, or may be integrated in the processor 1010.

In an example, the chip 1000 may further include an input interface 1030. The processor 1010 may control the input interface 1030 to perform communication with other device or chip, for example, obtain information or data from other device or chip.

In an example, the chip may further include an output interface 1040. The processor 1010 may control the output interface 1040 to perform communication with other device or chip, for example, output information or data to other device or chip.

In an example, the chip may be applied to the network device as described above. The chip may implement the process performed by the network device as described above. The specific process will not be elaborated here for simplicity.

In an example, the chip may be applied to the mobile terminal or the terminal device as described above. The chip may implement the process performed by the mobile terminal or the terminal device as described above. The specific process will not be elaborated here for simplicity.

It is to be noted that the chip mentioned here may be called a system-level chip, a system chip, a chip system or an on-chip system chip.

Figure 11:
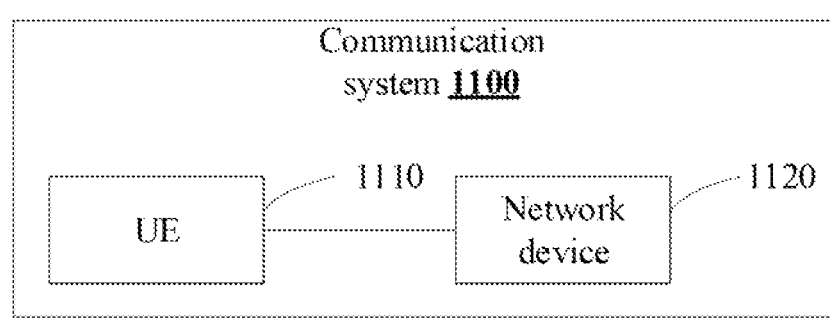
FIG. 11 illustrates a block diagram of a communication system according to some embodiments of the disclosure.

FIG. 11 illustrates a schematic block diagram of a communication system 1100 according to some embodiments of the disclosure. As illustrated in FIG. 11, the communication system includes a terminal device 1110 and a network device 1120.

The terminal device 1110 may be configured to implement the functions of the terminal device as described in the above methods. The network device 1120 may be configured to implement the functions of the terminal device as described in the above methods.

In some embodiments of the disclosure, a computer readable storage medium is provided, storing a computer program.

The computer program may be applied to the network device in the embodiments of the disclosure, and which, when executed by a processor, causes the processor to execute the processes performed by the network device as described above. The specific process will not be elaborated here for simplicity.

The computer program may be applied to the mobile terminal or terminal device in the embodiments of the disclosure, and which, when executed by a processor, causes the processor to execute the processes performed by the mobile terminal or terminal device as described above. The specific process will not be elaborated here for simplicity.

In some embodiments of the disclosure, a computer program product is provided, including a computer program.

The computer program may be applied to the network device in the embodiments of the disclosure, and which, when executed by a processor, causes the processor to execute the processes performed by the network device as described above. The specific process will not be elaborated here for simplicity.

The computer program may be applied to the mobile terminal or terminal device in the embodiments of the disclosure, and which, when executed by a processor, causes the processor to execute the processes performed by the mobile terminal or terminal device as described above. The specific process will not be elaborated here for simplicity.

In some embodiments of the disclosure, a computer program is provided.

The computer program may be applied to the network device in the embodiments of the disclosure, and which, when executed by a processor, causes the processor to execute the processes performed by the network device as described above. The specific process will not be elaborated here for simplicity.

The computer program may be applied to the mobile terminal or terminal device in the embodiments of the disclosure, and which, when executed by a processor, causes the processor to execute the processes performed by the mobile terminal or terminal device as described above. The specific process will not be elaborated here for simplicity.

It should be understood that, the processor mentioned here may be an integrated circuit chip having a signal processing function. The actions described in the above methods may be performed by hardware logic circuits or software instructions in the processor. The processor may be a general purpose processor, a Digital Signal Processor (DSP), an Application Specific Integrated Circuit (ASIC), a Field Programmable Gate Array (FPGA) or the like.

As people of ordinary skill in the art may appreciate, functions of the units in the apparatus as illustrated in the embodiments of the disclosure can be understood based on the above relevant descriptions regarding the information transmission method, and can be implemented by programs running a processor or by logical circuits. The functions of the units in the apparatus may be implemented by programs running in a processor or by specific logical circuits.

The abovementioned memory may include various media capable of storing program codes such as a U disk, a mobile hard disk, a Read-Only Memory (ROM), a Random Access Memory (RAM), a magnetic disk or an optical disk. As such, the embodiments of the disclosure are not limited to any specific combination of software and hardware.

The embodiments of the disclosure may be combined with each other freely without confliction.

In the several embodiments provided in the application, it shall be understood that the disclosed systems, devices and methods may be realized in other modes. For example, the embodiments of the above-described devices are only exemplary, for example, the division of the units is only a logic function division, other division modes may be adopted in practice, e.g., multiple units or components may be combined or integrated in another system, or some characteristics may be omitted or be not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is, the components may be positioned at one place or may be distributed on multiple network units. The objective of the solution of the embodiments may be fulfilled by selecting part of or all of the units according to actual needs.

In addition, in various embodiments of the disclosure, the functional units may be integrated in one processing unit, or the functional units may separately and physically exist, or two or more units may be integrated in one unit. The integrated units may be implemented by hardware or by hardware plus software functional units.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for determining a frequency resource, comprising:
for a hop in frequency domain, when a first part of a frequency resource of the hop is outside a first bandwidth part (BWP), moving, by a user equipment (UE), the frequency resource of the hop, such that the whole frequency resource of the hop is turned inside the first BWP;
wherein the moving comprises:
moving the whole frequency resource of the hop; or
moving, by the UE, the first part of the frequency resource of the hop;
wherein the starting RB of the first part of the ho after the moving is away from the starting RB of the first part of the hop prior to the moving by P RBs, wherein P indicates a number of RBs included in the hop.

2. The method of claim 1, wherein a starting resource block (RB) of the hop prior to the moving and a starting RB of the hop after the moving satisfy the following equation:

$$RB_{start}' = RB_{start} \bmod(N-P)$$

where $RB_{start}$ indicates the starting RB of the hop prior to the moving, N indicates a number of RBs included in the first BWP, and P indicates a number of RBs included in the hop, $RB_{start}'$ indicates the starting RB of the hop after the moving, and mod indicates a modulus operation.

3. The method of claim 1, wherein the starting RB of the hop after the moving is away from the starting RB of the hop prior to the moving by D RBs, wherein D indicates a number of RBs included in the first part of the frequency resource.

4. The method of claim 1, wherein the frequency resource of the hop comprises a second part which is inside the first BWP, and the first part after the moving is in front of the second part.

5. The method of claim 1, further comprising:
receiving, by the UE, a first message from a network device, wherein the first message is to indicate at least one of the following: a starting RB of the hop, or a number of RBs included in the hop; or
receiving, by the UE, a second message from a network device, wherein the second message is to indicate at least one of the following: a starting RB of the first BWP, or a number of RBs included in the first BWP.

6. The method of claim 1, wherein the hop is one of hops of an uplink data channel or an uplink control channel.

7. The method of claim 1, wherein the first BWP is an active BWP for the UE.

8. A user equipment (UE), comprising:
a processor; and
a memory storing a computer program executed by the processor;
wherein the processor is configured to, for a hop in frequency domain, move a frequency resource of the hop when a first part of the frequency resource of the hop is outside a first bandwidth part (BWP), such that the whole frequency resource of the hop is turned inside the first BWP; and
wherein the processor is futher configured to:
move the whole frequency resource of the hop; or
move the first part of the frequency resource of the hop;
wherein the starting RB of the first part of the hop after the moving is away from the starting RB of the first part of the hop prior to the moving by P RBs, wherein P indicates a number of RBs included in the hop.

9. The UE of claim 8, wherein a starting resource block (RB) of the hop prior to the moving and a starting RB of the hop after the moving satisfy the following equation:

$$RB_{start}' = RB_{start} \bmod(N-P)$$

where $RB_{start}$ indicates the starting RB of the hop prior to the moving, N indicates a number of RBs included in the first BWP, and P indicates a number of RBs included in the hop, $RB_{start}'$ indicates the starting RB of the hop after the moving, and mod indicates a modulus operation.

10. The UE of claim 8, wherein the starting RB of the hop after the moving is away from the starting RB of the hop prior to the moving by D RBs, wherein D indicates a number of RBs included in the first part of the frequency resource.

11. The UE of claim 8, wherein the frequency resource of the hop comprises a second part which is inside the first BWP, and the first part after the moving is in front of the second part.

12. The UE of claim 8, further comprising:
a transceiver, configured to receive a first message from a network device, wherein the first message is to indicate at least one of the following: a starting RB of the hop, or a number of RBs included in the hop.

13. The UE of claim 8, wherein the hop is one of hops of an uplink data channel or an uplink control channel.

14. The UE of claim 8, further comprising:
a transceiver, configured to receive a second message from a network device, wherein the second message is to indicate at least one of the following: a starting RB of the first BWP, or a number of RBs included in the first BWP.

* * * * *